United States Patent
Birdi et al.

(10) Patent No.: US 8,729,752 B2
(45) Date of Patent: May 20, 2014

(54) ENHANCED SPRAY COOLING TECHNIQUE FOR WEDGE COOLING

(75) Inventors: Balwinder Singh Birdi, Tucson, AZ (US); Simon Waddell, Oro Valley, AZ (US); William Scherzinger, Oro Valley, AZ (US)

(73) Assignee: Honeywell International, Inc, Morristown, NJ (US)

( * ) Notice: Subject to any disclaimer, the term of this patent is extended or adjusted under 35 U.S.C. 154(b) by 372 days.

(21) Appl. No.: 13/181,356

(22) Filed: Jul. 12, 2011

(65) Prior Publication Data

US 2013/0015729 A1    Jan. 17, 2013

(51) Int. Cl.
*H02K 9/00* (2006.01)
*H02K 9/08* (2006.01)

(52) U.S. Cl.
USPC ............ 310/61; 310/54; 310/57; 310/59

(58) Field of Classification Search
USPC ............ 310/52, 54, 57, 61, 194, 216.125, 59, 310/216.126
See application file for complete search history.

(56) References Cited

U.S. PATENT DOCUMENTS

| | | | | |
|---|---|---|---|---|
| 1,502,065 | A * | 7/1924 | Smith | 310/52 |
| 2,518,881 | A * | 8/1950 | Goddard | 60/258 |
| 2,906,103 | A * | 9/1959 | Saltzman | 62/231 |
| 3,414,753 | A * | 12/1968 | Hruda | 313/35 |
| 3,459,979 | A * | 8/1969 | Carew et al. | 310/54 |
| 4,400,181 | A * | 8/1983 | Snell et al. | 48/197 R |
| 4,621,210 | A | 11/1986 | Krinickas | |
| 4,880,354 | A * | 11/1989 | Teranishi et al. | 416/95 |
| 4,943,746 | A | 7/1990 | Scherzinger et al. | |
| 5,140,204 | A * | 8/1992 | Cashmore et al. | 310/61 |
| 6,661,133 | B2 | 12/2003 | Liebermann | |
| 7,786,630 | B2 | 8/2010 | Waddell et al. | |
| 2003/0094872 | A1* | 5/2003 | Tornquist et al. | 310/91 |
| 2004/0080218 | A1* | 4/2004 | Weidman et al. | 310/61 |
| 2010/0155034 | A1* | 6/2010 | Muller et al. | 165/104.26 |
| 2012/0025639 | A1* | 2/2012 | Zywot et al. | 310/54 |

FOREIGN PATENT DOCUMENTS

SU    1417111 A1 *    8/1988

OTHER PUBLICATIONS

Webpage Http://unitconverter.org.*

* cited by examiner

*Primary Examiner* — Tran Nguyen
*Assistant Examiner* — Jose Gonzalez Quinone
(74) *Attorney, Agent, or Firm* — Shimokaji & Associates, P.C.

(57) ABSTRACT

A wedge cooling apparatus and method for cooling a rotating machine, such as a generator, disperses a spray of cooling fluid into the wedges of the generator via a pipe that runs along the length of each of the wedges. The pipe may include a plurality of spray delivery devices to spray cooling fluid from the pipe to the inside of the wedges. The spray cooling method results in a high heat transfer coefficient of about 2000-3000 W/m²C as opposed to conventional conduction cooling, which has a heat transfer coefficient of about 200-300 W/m²C. The apparatus and method of the present invention efficiently removes heat from high powered, high current density designed generators.

15 Claims, 4 Drawing Sheets

ENHANCED SPRAY COOLING TECHNIQUE FOR WEDGE COOLING

BACKGROUND OF THE INVENTION

The present invention relates to apparatus and methods for heat removal and, more particularly, apparatus and methods for spray cooling a wedge of a generator rotor.

Heat removal in conduction cooling depends on the thickness of the conductive media. If the thickness of the conductive material can be reduced, heat removal is improved.

In generators, electromagnetic losses occur in the magnetic iron and the copper. These losses result in production of heat which must be removed to maintain overall temperature below that allowable for the copper coating and the insulation used in the construction of the generators. The rotor core, which is made of magnetic iron, can be conduction cooled by flowing fluid through the rotor shaft. However, the removal of heat from copper is better managed if oil is passed through the hollow wedges. Due to lower thermal resistance, the flow of fluid in the vicinity of copper is much more effective in removing heat from the copper and in keeping the overall temperature below the allowable limit. This is done with conduction mode of heat removal.

Since the heat transfer coefficient (HTC) depends upon the velocity of the fluid, the removal of heat is not very efficient and a very high flow is needed to create a reasonable HTC for conduction cooling. Further, because the rotor is a rotating component, having a large amount of fluid at a radius away from the rotor shaft is not desirable, especially for high powered larger diameter and high speed machines.

As can be seen, there is a need for an apparatus and method for heat removal from a rotating machine, such as a generator.

SUMMARY OF THE INVENTION

In one aspect of the present invention, a spray cooling manifold comprises a manifold ferrule adapted to circumscribe a shaft of a rotating machine; a manifold pipe having a bend of about 90 degrees having a first end attached to the manifold ferrule and a second, opposite end; a cooling fluid channel running from an inside surface of the manifold ferrule to the second, opposite end of the manifold pipe; and a pipe extending from the second, opposite end of the manifold pipe, the pipe adapted to extend into a wedge of the rotating machine, the pipe having a plurality of holes formed therealong.

In another aspect of the present invention, a rotating machine rotor comprises a shaft; a plurality of coils disposed on the shaft; a plurality of wedges disposed between the coils; bands securing the wedges on the rotor; and a manifold comprising a manifold ferrule adapted to circumscribe the shaft; a plurality of manifold pipes, each having a bend of about 90 degrees, each having a first end attached to the manifold ferrule and a second, opposite end attached to a wedge pipe extending into the wedges; a cooling fluid channel running from an inside surface of the manifold ferrule to the wedge pipe; and a plurality of holes disposed along the wedge pipe.

In a further aspect of the present invention, a method for cooling a rotor of a rotating machine comprises spraying a cooling fluid into wedges of the rotor via a wedge pipe centrally disposed along a wedge of the rotating machine.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a wedge cooling apparatus and method for cooling a rotating machine, such as a generator. The method disperses a spray of cooling fluid into the wedges of the generator via a pipe that runs along the length of each of the wedges. The pipe may include a plurality of spray delivery devices to spray cooling fluid from the pipe to the inside of the wedges. The spray cooling method results in a high heat transfer coefficient of about 2000-3000 W/m$^2$C as opposed to conventional conduction cooling, which has a heat transfer coefficient of about 200-300 W/m$^2$C. The apparatus and method of the present invention efficiently removes heat from high powered, high current density designed generators.

Figure 1:
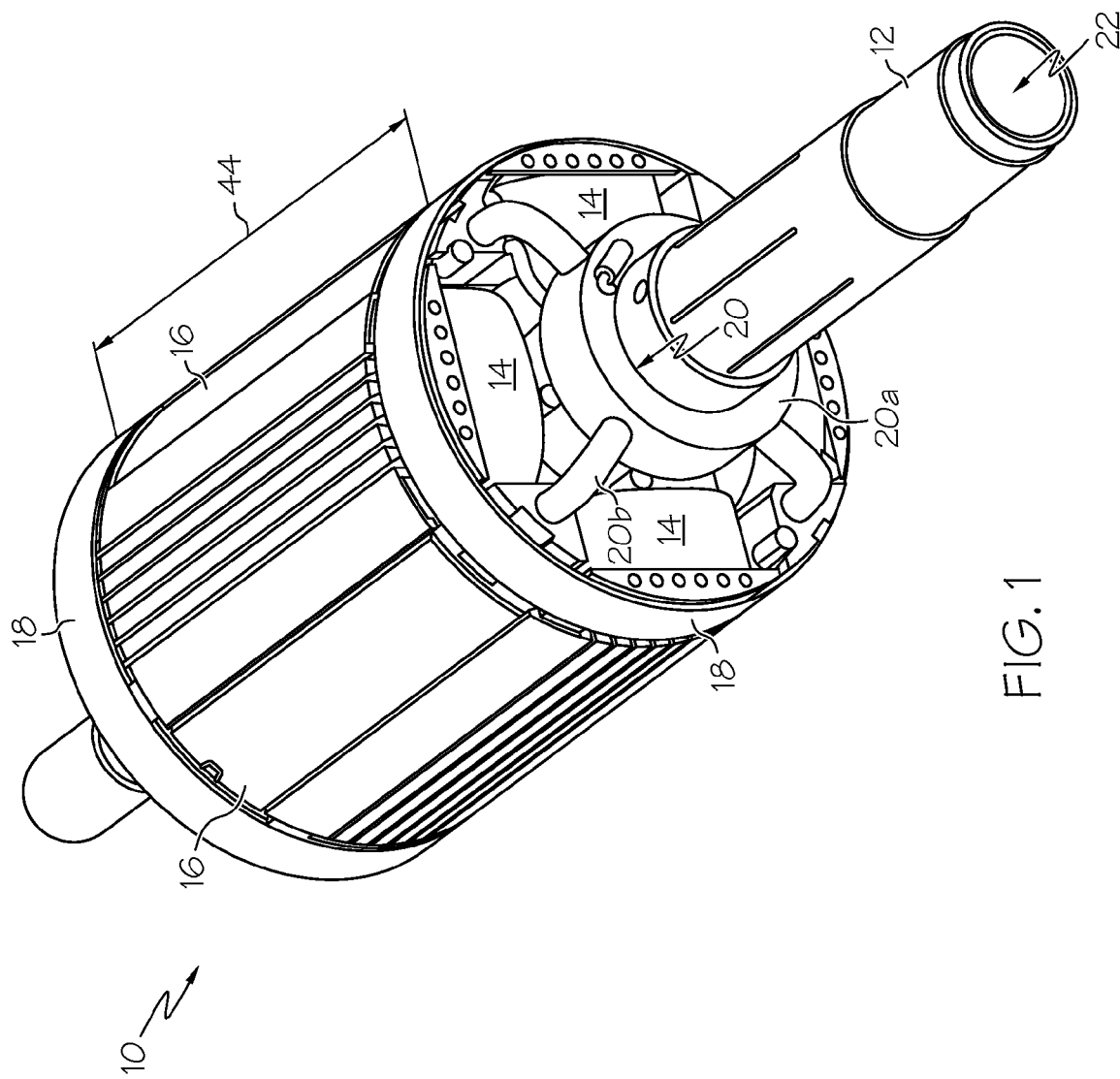
FIG. 1 is a perspective view of a rotating machine rotor showing a fluid manifold and wedge support according to an exemplary embodiment of the present invention.

Referring to FIG. 1, there is shown a rotor 10 having a shaft 12 and a plurality of windings 14 disposed about the shaft 12. Wedges 16 may be disposed between adjacent ones of the windings 14. A band 18 may be used to help secure the wedges 16 to the rotor 10. The wedges 16 may be disposed between the bands 18. A manifold 20 may fluidly interconnect an interior 22 of the shaft 12 with the wedges 16. The manifold 20 may include a manifold ferrule 20a, that may circumscribe the shaft 20 and a plurality of manifold pipes 20b.

Figure 2:
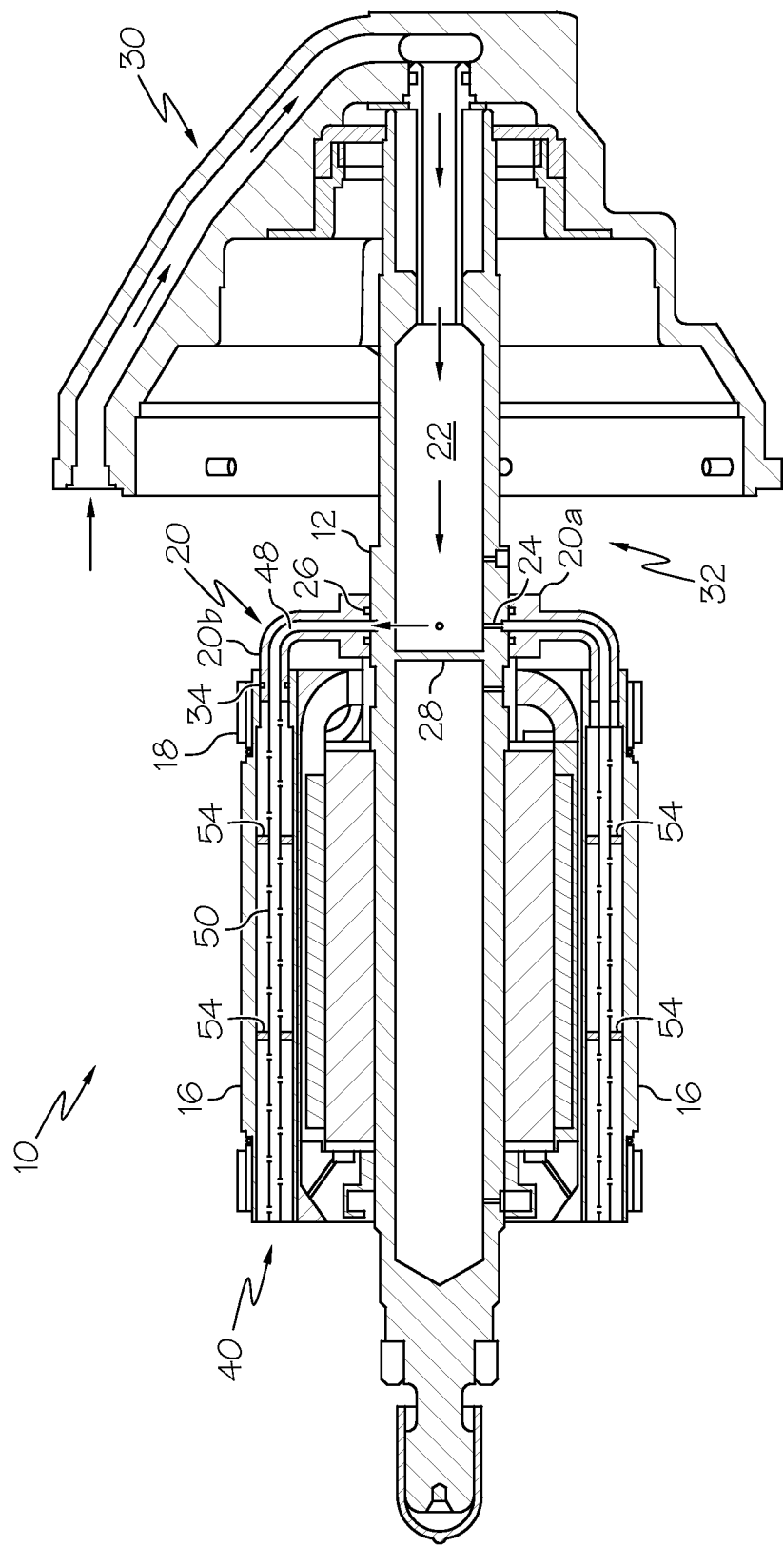
FIG. 2 is a cross-sectional view of the rotating machine rotor of FIG. 1.
Figure 3:
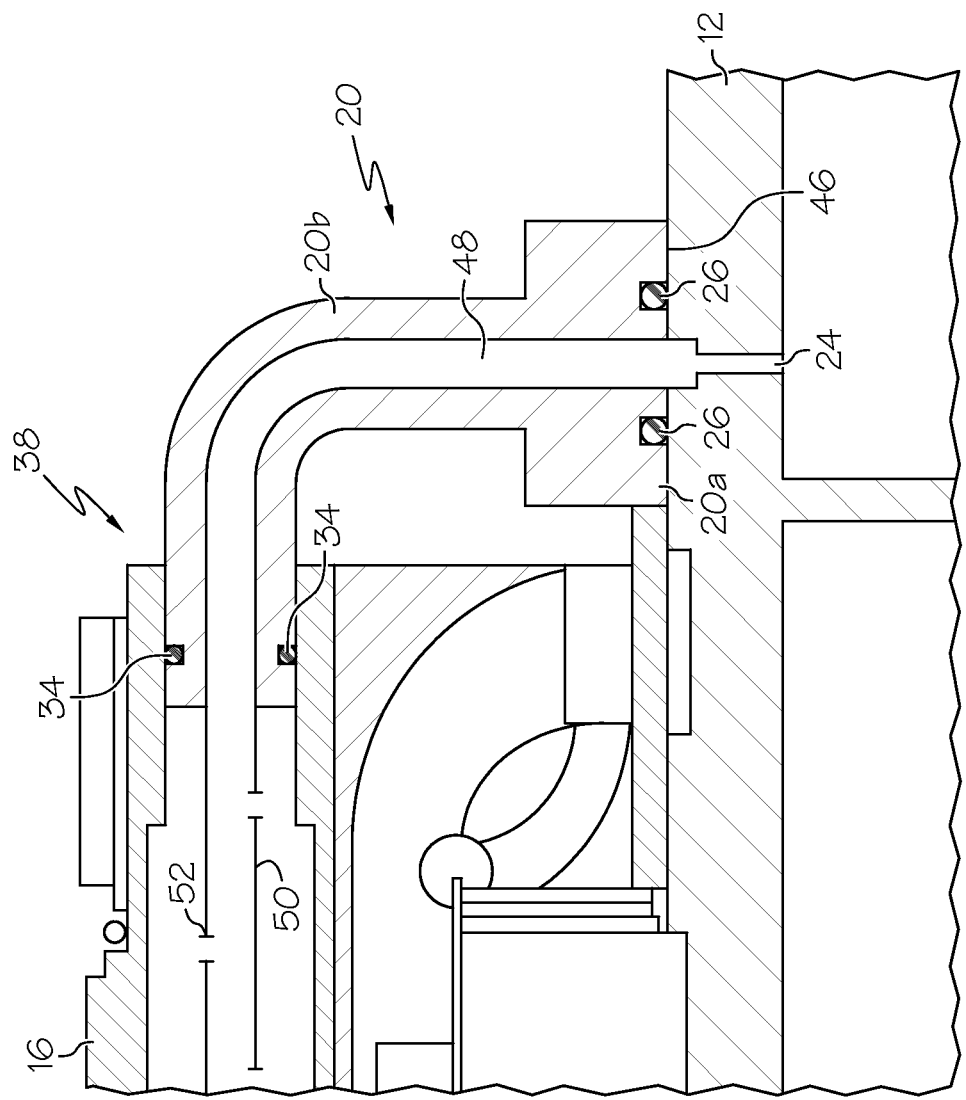
FIG. 3 is close up cross-sectional view of a portion of the rotating machine of FIG. 1.
Figure 4:
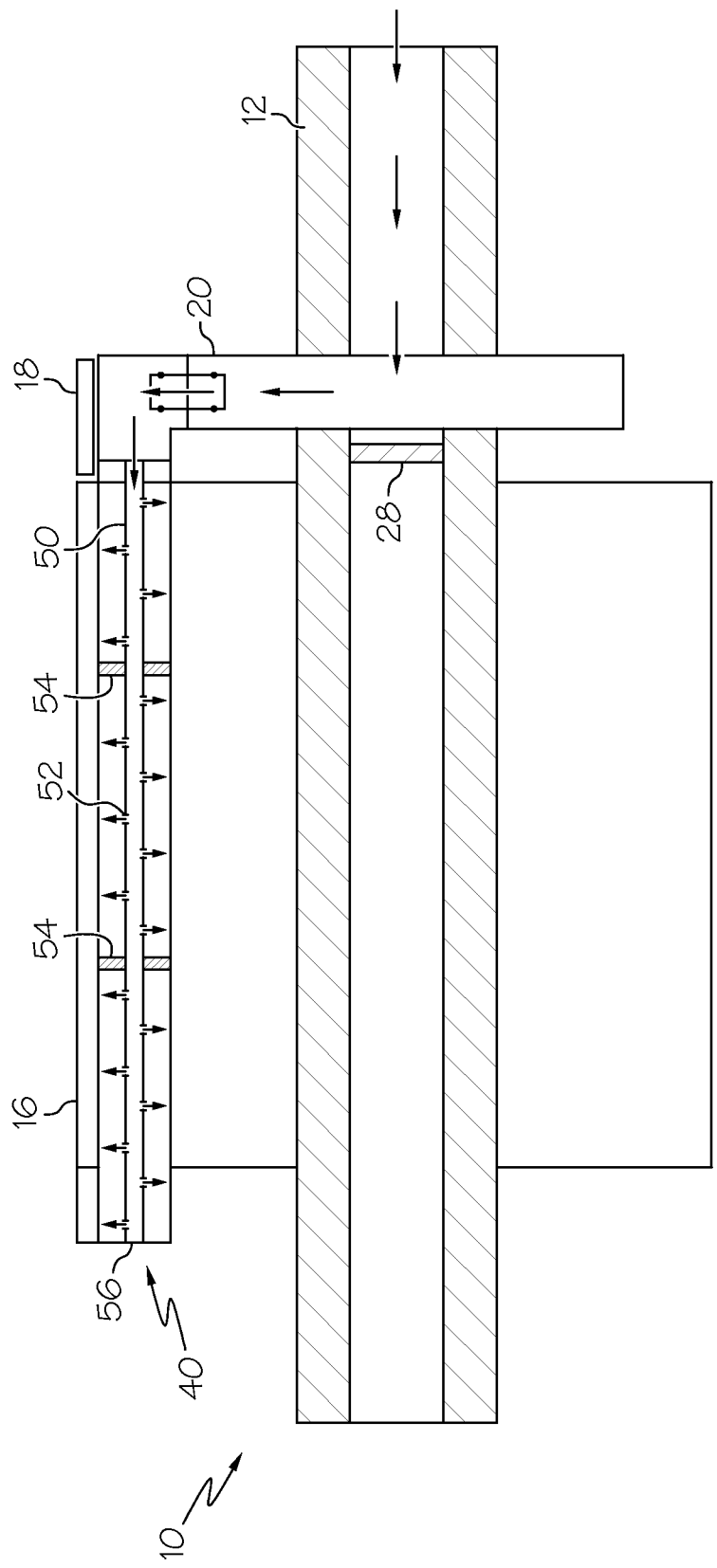
FIG. 4 is a cross-sectional schematic view of the rotating machine of FIG. 1.

Referring now to FIGS. 2 through 4, the shaft 12 may include a through hole 24 fluidly interconnecting the interior 22 of the shaft 12 with a cooling channel 48 of the manifold 20. The cooling channel 48 may run from an inside surface of the manifold ferrule 28a to an anti-drive end 38 of the manifold pipe 20b. O-rings 26, typically made of a rubber of a suitable durometer to prevent leakage under high pressure due to centrifugal force, may be used to seal the manifold ferrule 20a to the shaft 12. The o-rings 26 may include first and second o-rings running about an inside surface 46 of the manifold ferrule 20a. A shaft plug 28 may be used to divert cooling fluid, such as oil, from the shaft 12, through the through hole 24, and into the manifold 20. The shaft 12 may receive shared oil from a gearbox (not shown) via an end bell 30 of the rotor 10. In the embodiments shown in FIG. 2, the manifold 20 is disposed on an anti-drive end 32 of the rotor 10.

The manifold pipes 20b may turn about 90 degrees to deliver the cooling fluid from the manifold ferrule 20a to the wedges 16. Wedge o-rings 34 may seal the manifold 20 with the wedges 16.

A central pipe 50 may be disposed inside each of the wedges 16. In some embodiments, the pipe 50 may be centrally located along the length 44 of the wedge 16. The pipe 50 typically extends for the entire length 44 of the wedges 16. In some embodiments, however, the pipe 50 may only partially extend into the wedges 16. The pipe 50 may be connected with the manifold pipe 20b via various attachment means. In some embodiments, the pipe 50 may press fit against the manifold pipe 20b. A seal (not shown), such as an o-ring, may prevent leaks of cooling fluid as it passes from the manifold pipe 20b into the pipe 50.

The cooling fluid channel 48 of the manifold 20 may be in fluid communication with the pipe 50 and may be adapted to deliver cooling fluid into the pipe 50. The pipe 50 may have a plurality of holes 52 for spraying the cooling fluid into the wedges 16. Only one exemplary wedge 16 is shown in FIG. 4. A spray delivery device (not shown), such as a spray nozzle or a sieve, may be disposed at each of the holes 52 to provide a desired spray pattern for the cooling fluid exiting the pipe 50. The pressure of the fluid delivered to the pipe 50 may have a high pressure due to centrifugal forces on the cooling fluid. The cooling fluid sprayed into the wedges 16 may exit from an open end 40 (drive end) of the wedges 16. The drive end 40 of the pipe 50 may be sealed with a pipe plug 56. The design of the pipe 50 (such as the number of holes 52, the diameter, and the like), along with the pressure and volume of cooling fluid, may be used to control the cooling of the wedges 16. The pipe 50 may be supported in the wedges 16 with one or more radial pipe supports 54 to deal with displacement and vibration issues. The radial pips supports 54 may position the pipe 50 centrally in the wedge 16 to allow cooling fluid to flow out to different locations along the length of the wedge 16.

The manifold 20 may be designed for various types of rotors 10. For example, the manifold 20 may be designed to deliver cooling fluid to a rotor having four wedges 16, as shown in FIG. 1. Other rotors, including 4, 6 and 8 pole rotors, may be similarly cooled.

The spray cooling method described herewithin is particularly adapted for use in rotors having a variety of wedge lengths 44, including wedge lengths 44 greater than 4 inches.

It should be understood, of course, that the foregoing relates to exemplary embodiments of the invention and that modifications may be made without departing from the spirit and scope of the invention as set forth in the following claims.

We claim:

1. An oil-cooled electrical generator comprising:
    a rotor having coils positioned around a hollow shaft, an interior of the hollow shaft configured to receive shared oil from a gearbox;
    one or more wedges interspersed between and in contact with the coils;
    one or more spray pipes supported on radial pipe supports within the one or more wedges, the one or more spray pipes having holes formed therein;
    a manifold ferrule circumscribing the shaft and being in fluid communication with the interior of the shaft; and
    one or more manifold pipes in fluid communication with the manifold ferrule and the one or more spray pipes such that, upon rotation of the rotor, oil from the interior of the shaft emerges from the holes as spray, internally constrained within the one or more wedges, to internally cool the one or more wedges and provide for cooling of one or more adjacent coils.

2. The electrical generator of claim 1, further comprising:
    at least one o-ring disposed about an end of the manifold pipe; and
    first and second o-rings disposed on an inside surface of the manifold ferrule.

3. The electrical generator of claim 1, wherein the plurality of holes each include a spray delivery device.

4. The electrical generator of claim 3, wherein the spray delivery device is a spray nozzle.

5. The electrical generator of claim 3, wherein the spray delivery device is a sieve.

6. The electrical generator of claim 5, wherein the sieve has a plurality of passages from about 0.030 inch to about 0.040 inch.

7. The electrical generator of claim 1, comprising from about four to about eight of the manifold pipes.

8. A rotating machine rotor comprising:
    a shaft;
    a plurality of coils disposed on the shaft;
    one or more wedges disposed between the coils;
    bands securing the one or more wedges on the rotor;
    a manifold comprising a manifold ferrule adapted to circumscribe the shaft;
    one or more manifold pipes each having a first end attached to the manifold ferrule and a second, opposite end attached to a wedge pipe extending into the wedges, the wedge pipe being supported centrally in the wedge with one or more radial pipe supports;
    a plurality of oil channels running from an inside surface of the manifold ferrule to the wedge pipes; and
    a plurality of holes disposed along the wedge pipes,
    wherein the wedge pipes are configured to enable oil to can emerge from the holes in a cooling spray as a result of pressure produced by centrifugal force resulting from rotation of the rotor, and
    wherein the wedge pipes are configured to enable the cooling spray to impinge on interior surfaces of the wedge pipes and to be thereby constrained within the wedge pipes.

9. The rotating machine rotor of claim 8, further comprising:
    at least one o-ring disposed about the second, opposite ends of the manifold pipes; and
    first and second o-rings disposed on the inside surface of the manifold ferrule.

10. The rotating machine rotor of claim 8, further comprising a spray delivery device at each of the plurality of holes.

11. The rotating machine rotor of claim 10, wherein the spray delivery device is either a spray nozzle or a sieve.

12. The rotating machine rotor of claim 8, further comprising a plurality of through holes in the shaft, the through holes fluidly communicating with the cooling fluid channels of the manifold.

13. The rotating machine rotor of claim 12, further comprising a shaft plug adapted to divert cooling fluid into the plurality of through holes.

14. The rotating machine rotor of claim 8, wherein the manifold is disposed on an anti-drive end of the shaft.

15. The rotating machine rotor of claim 14, wherein a drive end of the plurality of wedges is open and a drive end of the wedge pipe is sealed with a pipe plug.

\* \* \* \* \*